Sept. 13, 1966  J. H. MYER ETAL  3,272,195
DEVICE FOR SLICING CRYSTALLINE MATERIAL
Original Filed Jan. 2, 1963  3 Sheets-Sheet 3
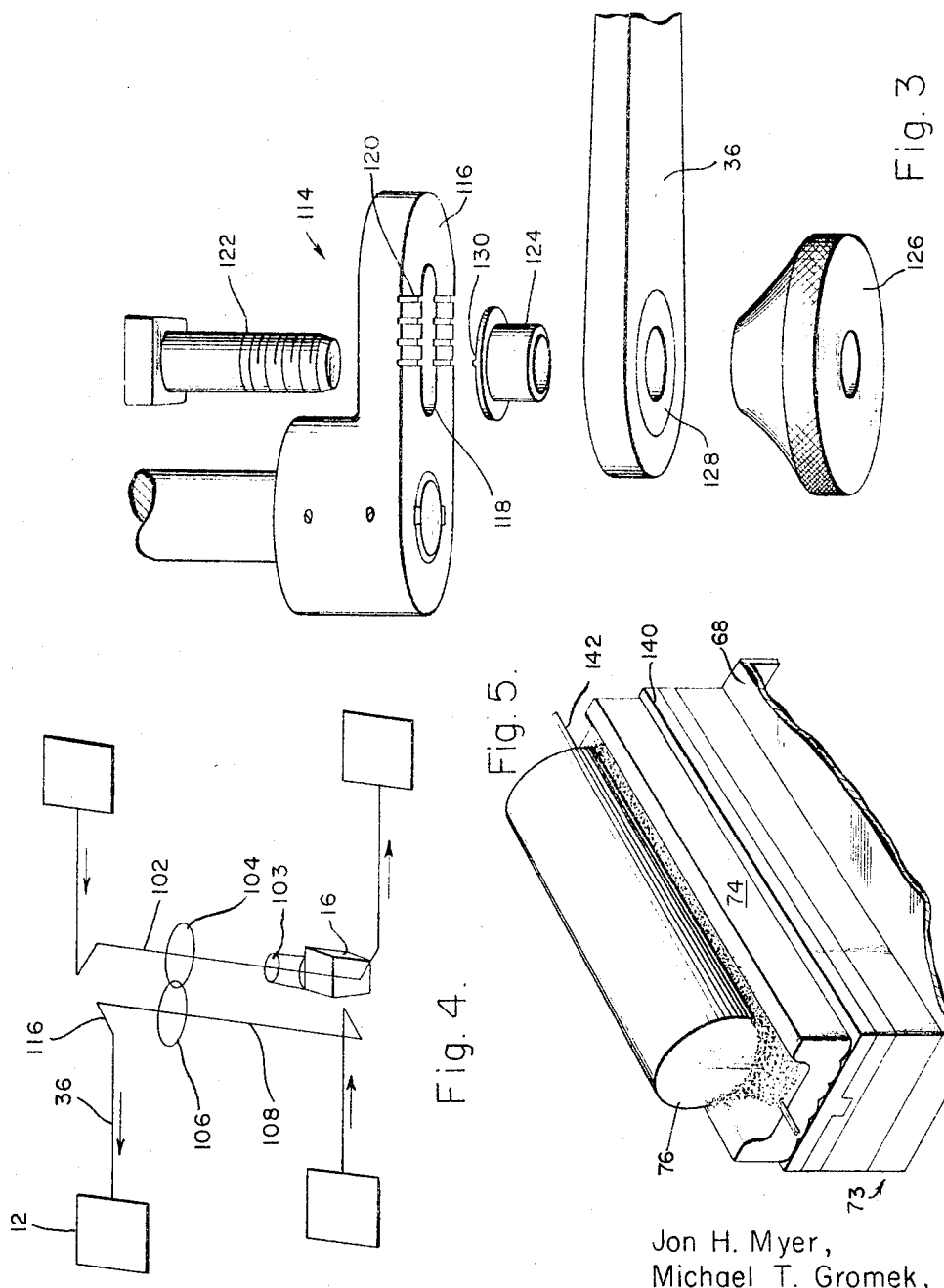
Jon H. Myer,
Michael T. Gromek,
INVENTORS.
BY.
Walter R. Thiel
ATTORNEY.

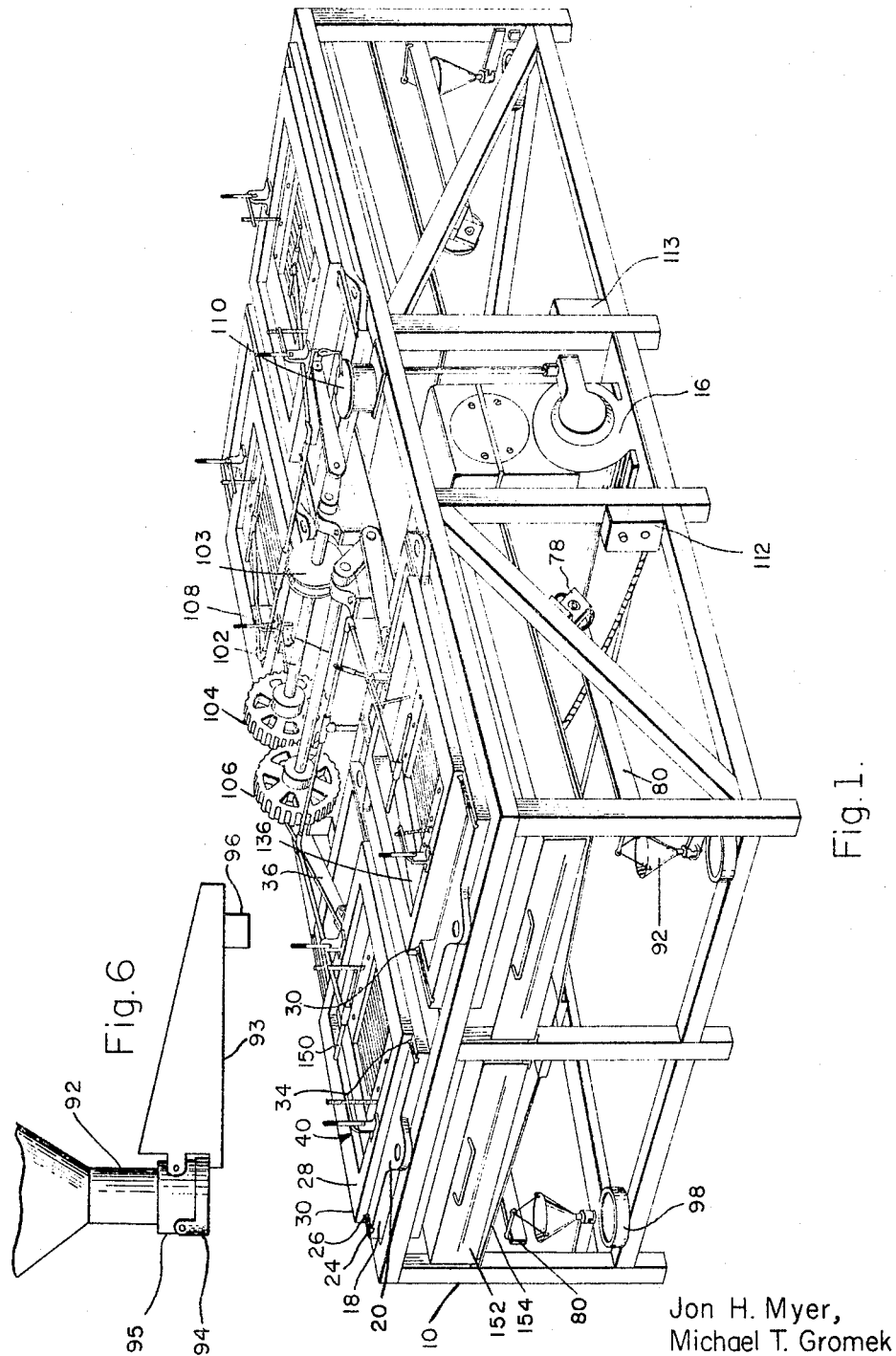

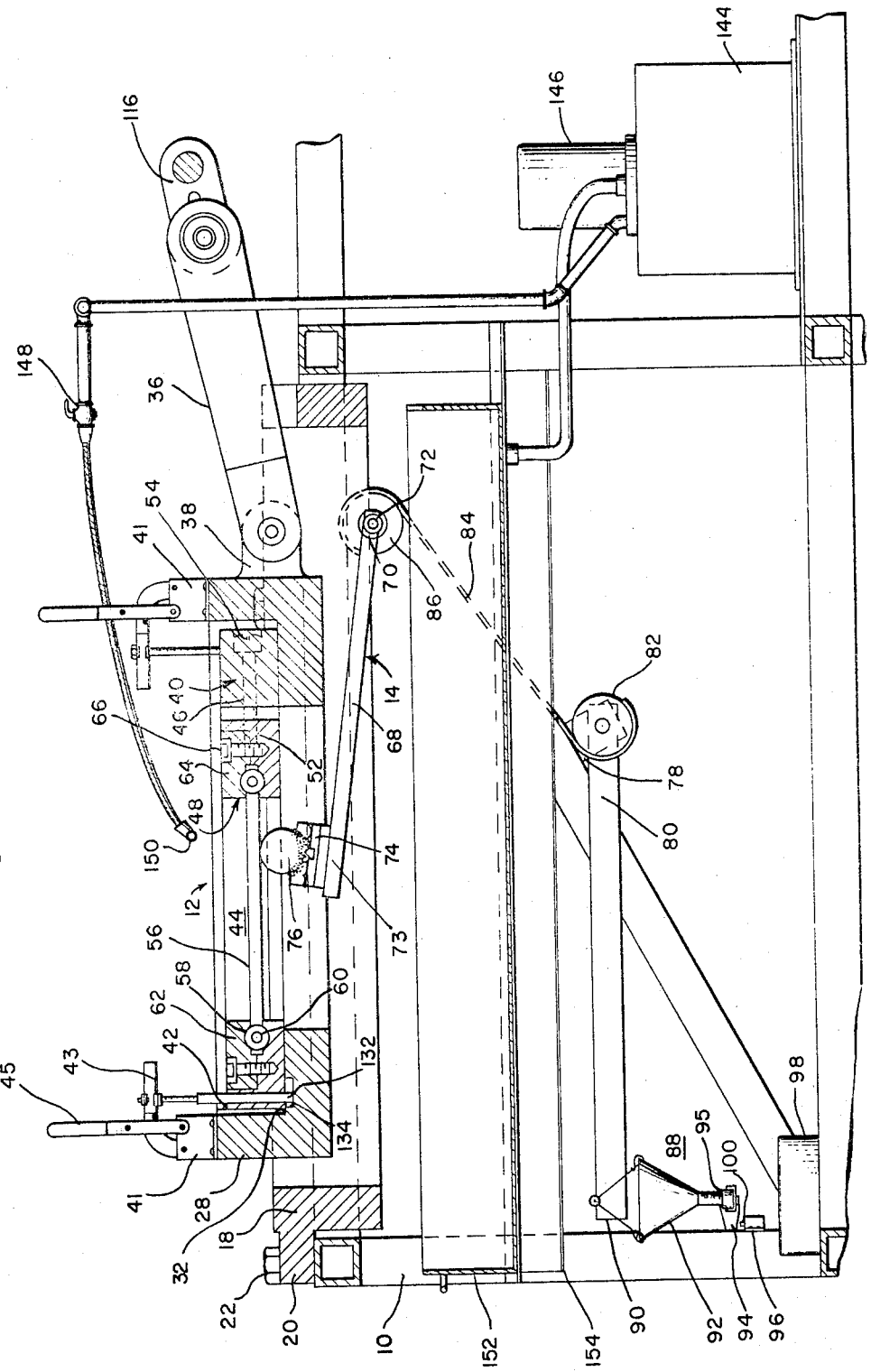

United States Patent Office 3,272,195
Patented Sept. 13, 1966

3,272,195
DEVICE FOR SLICING CRYSTALLINE MATERIAL
Jon H. Myer, Newport Beach, and Michael T. Gromek, Campbell, Calif., assignors to Hughes Aircraft Company, Culver City, Calif., a corporation of Delaware
Continuation of application Ser. No. 248,968, Jan. 2, 1963.
This application Mar. 23, 1964, Ser. No. 355,994
14 Claims. (Cl. 125—16)

This application is a continuation of an application of Jon H. Myer and Michael T. Gromek, Serial No. 248,968, filed January 2, 1963, entitled, Device for Slicing Semiconductor Crystals and the Like, now abandoned.

The present invention relates to means for cutting bodies of crystalline material and the like into thin slices, and more particularly to an abrasive cutting device for slicing precious and fragile crystalline material such as semiconductor or gem stone material in a productive manner which permits delicate control of the cutting action.

It has already become known in semiconductor device fabrication to utilize a cutting disk with a peripheral coating of abrasive such as diamond dust and constructed in the manner of a circular saw. By the use of a cutting device of this type it has been possible to slice semiconductor crystal rods having a diameter of not more than 30 mm. by reason of the fact that the cutting disks must be fitted with relatively heavy central guide disks or separating plates to prevent bending or distortion under the effect of the relatively high cutting pressures required. In order to be sufficiently rigid cutting disks of this type require a certain minimum thickness resulting in a substantial wastage of the precious semiconductor material because the kerf will be at least equal to or in general greater by about 0.05 mm. than the thickness of the saws.

To overcome the problem of wastage present in the rotating disk devices, several systems having reciprocating saws utilizing strings, wires, or strips of metal have been developed. Reciprocating saw systems are not new in the art. The technique of using a rope covered with a slurry of sand and water was developed early in the history of civilization in Egyptian and Roman quarries as a means of cutting marble or stone into regular shapes. A system illustrating the use of reciprocating bands of thin metal as blades is shown and described in U.S. Patent No. 3,032,026 to G. Raabe dated May 1, 1962. While the above mentioned systems have proven advantageous under certain circumstances all of them have the common handicap of providing extremely low productivity while requiring excessive operator surveillance. As an example, a device utilizing reciprocating metal bands generally requires between five and ten hours to cut through a crystal ingot of the diameter of from 20 mm. to 30 mm. and because of the complexity of the device requires that at all times an attendant or operator supervise its operation.

Therefore, it is an object of the present invention to provide an improved device for cutting crystalline material into slices which combines gentle sawing action and minimal kerf waste with high productivity and minimal attendance.

Another object of this invention is to provide an improved device for simultaneously cutting into slices a plurality of crystal bodies which includes a means for automatically shutting off the device in a manner independent of the work load or the number of work stations of the device.

A further object of the invention is to provide an improved reciprocating cutting device wherein it is possible to incline the plane of the cutting blades relative to the plane of their motion to facilitate the introduction of new abrasive particles between the blade and the object it is cutting.

A still further object of the present invention is to provide a multiple work station cutting device having a single driving force wherein the forces reciprocating the work stations are dynamically balanced.

A still further object of the present invention is to provide an improved device for cutting crystalline material into slices which includes a means for continuous flooding of the blades and body to be cut with a recirculating abrasive slurry.

These and other objects of this invention will be apparent from the following description taken in accordance with the accompanying drawings throughout which like reference characters indicate like parts, and in which:

FIGURE 1 is a perspective view of a presently preferred embodiment of the improved reciprocating device of the present invention illustrating the relative location of the four work stations and the single electric motor providing dynamically balanced reciprocation of each of the work stations;

FIG. 2 is a longitudinal elevational section along the center line of the forward left work station and a portion of the abrasive feed system of the present invention as illustrated in FIG. 1;

FIG. 3 is an exploded enlarged view of a portion of one of the drive shafts and connecting rod and crank assemblies illustrating the mechanism provided to adjust the travel of the sled members;

FIG. 4 is a schematic of the drive shafts, cranks, connecting rods and cutting assemblies illustrating the dynamic balance of the reciprocation of the cutting assemblies;

FIG. 5 is a perspective view of the work holding fixture and a portion of the support arm illustrating the attachment of the ingot to the fixture, and a portion of the motor disabling circuit; and FIG. 6 is an enlarged view of the automatic triggering device of the present invention showing the triggering stop but eliminating, for clarity, the adjacent structural elements.

In general, the presently preferred embodiment of the present invention comprises a plurality of reciprocable cutting assemblies each including at least two relatively thin metal blades adapted to provide a pair of parallel cutting surfaces spaced by a distance equal to the thickness of the slices to be cut from a crystal body and a plurality of crystal body mounting assemblies for positioning said body in engagement with the edge of the blades. Each of the mounting assemblies includes a force biasing means to bias the bodies into engagement with the blades under a resilient pressure and a retracting means to separate the bodies and the blades when the cutting operation has been completed. A single drive means is coupled to each of the cutting assemblies to simultaneously reciprocate them. There is also provided an abrasive feed means to continuously apply liquid abrasive to the blades and a disabling means to disable the drive means and abrasive feed means when the last of the bodies has been cut.

Referring now to FIGS. 1 and 2 the present cutting device comprises a base or frame member 10 of a material such as steel having four identical work stations each including a reciprocable cutting assembly 12 and a work piece holding assembly 14, and a single prime mover 16 such as an electric motor positioned on the frame 10 centrally of the stations to provide reciprocating motion to each of the cutting assemblies 12. Since each of the four work stations is identical in structure and composition only the structure of one work station will be described in detail but it should be understood that in like fashion each of the other three work stations contains a like arrangement of structure. While the presently preferred embodiment has been shown to include four work stations it should be understood that this has been done merely for completeness of description, since the device may include a single work station without varying from the scope of the invention.

The reciprocable cutting assembly 12 includes a frame-like support member or track 18 constructed of a material such as steel and having a rectangular shape. spaced around the periphery of the support member 18 are a plurality of attachment flanges 20 shown typically as three but not limited thereto. Each of the flanges 20 contains a bore and a conventional fastening means such as an attachment and adjustment bolt 22 that is matable with a threaded bore (not shown) in the frame 10 to attach the support member 18 to the frame 10 and to level and lock the position of the member 18. In each of the longitudinal sides of the support member 18 is a parallel groove or track 24, and confined therein are a plurality of roller bearings 26.

Positioned for reciprocation on the support member 18 is a sled member 28. To provide rigidity and stability to the cutting operation the sled member 28 is relatively heavy compared with the frame 10 and typically is of a material such as cast iron. The sled member 28 is constructed in a rectangular frame-like configuration having a bearing flange 30 extending out from both of the longitudinal sides and a support flange 32 extending inwardly around the inside periphery. When the sled member 28 is positioned on the support member 18 a longitudinal groove or notch 34 in the bearing flange 30 is in alignment with the track 24 in the support member to receive the roller bearing 26. This enables the sled member 28 to be reciprocated with a minimum of friction. To attach the sled 28 to a connecting rod 36 for reciprocation a pair of attachment flanges 38 having a bolt reeciving aperture extends from one of the transverse sides of the sled member 28.

A blade frame or carrier member 40 is mounted in the sled member 28 by means of a pair of clamps 41 attached to the top of the sled member 28. The clamps 41 include an adjustable screw 43 that is brought in contact with the top surface of the blade frame and by toggling a tightening arm 45 provide a force on the blade frame 40 sufficient to position it in the sled member 28. The blade frame 40 is typically of steel and includes at one end a first support shoulder 42 grooved to receive a blade package 44, at the other end a plurality of threaded bores 46, and a plurality of tooling balls (not shown) which protrude from accurately located positions on both sides of the blade frame 40 and are mated with accurately machined depressions (not shown) in the sled to provide alignment of the blade frame 40 in the sled member 28. The sides of the blade frame 40 adjacent to the end thereof containing the bores 46 each contain a groove (not shown) positioned symmetrically with respect to the height of the carrier 40. Supported by the groove is the flange of a movable blade assembly clamp 48 which includes a second support shoulder 50 grooved to receive the other side of the blade assembly 44. The movable support 48 also contains a plurality of threaded bores 52 each of which is in alignment with one of the bores 46 in the carrier member 40 and contains tensioning bolts 54. The tensioning bolts 54 are inserted through the bores 46 in the carrier 40 and threaded into the bore 52 in the movable support 48 to apply tensioning forces to the blade assembly 44.

A blade assembly or package 44 of the type to be mounted in the carrier member 40 is shown and described in a copending application, Serial No. 248,992, filed on January 2, 1963, of the assignee of this application. This assembly comprises at least two elongated thin metallic ribbon blades 56 arranged in juxtaposition with a spacing means 58 such as a washer inserted between the blades near their ends. The thickness of this spacing means is equal to the sum of the thickness of the slice of the semiconductor material to be cut and an additional abrasive clearance dimension. The blades 56 and washers 58 contain accurately positioned apertures so that an indexing means 60 such as a pin can be inserted therethrough to assemble and align the assembly. If it is desirable to give the assembly rigidity in one plane a portion of the blades adjacent to the washers and the washers are covered with a thermosetting resin bonding the washers 58 to the blades 56.

To mount the blade assembly 44 in the blade frame 40 it is positioned in the grooves in the first support shoulder 42 and the movable support 48 and first and second blade assembly clamp members 62, 64 conforming to the shape of the blade assembly 44 are brought into contact with the exposed surface of the assembly and are secured to the blade frame 40 and the movable support 48 respectively by a conventional fastening means such as a bolt 66.

Since one end of the blade assembly 44 is held in the blade frame 40 and the other end is supported in the movable support 48 any force applied to the movable support 48 by the tensioning bolts 54 is transmitted to the blade assembly 44; therefore, since the force applied to the movable support is through a plurality of tensioning bolts an even tension will be applied to the blades 56 in the blade assembly 44.

The work piece holding assembly 14 includes a support arm or platform 68 pivotable about a first end 70 attached to a shaft 72 that is mounted to the frame 10 below the elevation of the plane of reciprocation of the sled member 28. The support arm 68 has a width less than the width of the juxtapositioned blades 56 of the blade assembly 44 and has mounted to a second end 73 a holding fixture 74 containing a work piece or crystal ingot 76. Thus the support arm 68 can be pivoted about the first end 70 to bring the work piece or crystal ingot 76 into edgewise engagement with the blades 56 of the blade assembly 44.

Pivotably mounted to a bracket 78 extending from a diagonal portion of the frame 10 below the shaft 72 is a balance arm 80 and a first pulley 82. A metal band 84 is attached to and circumscribes the first pulley 82 in a first direction and is attached to and circumscribes a second pulley 86 in a second direction, opposite from the first direction. The second pulley is secured to the shaft 72. Because of the attachment of the band 84 to the first and second pulleys 82, 86, when a weight 88 is suspended from a free end 90 of the balance arm 80 the arm 68 rotates in a clockwise direction to bring the crystal ingot 76 into engagement with the blades 56 of the blade assembly 44 under a resilient pressure.

The time necessary for a complete slicing operation at each work station is different, because of such variables as newness of blades and ingot size and composition. In addition, electrolytic action of the sludge can destroy the surface of the newly cut slices if the blades remain in resting contact for prolonged periods. Therefore, to prevent damage to the ingot 76 and the holding fixture 74 the blades 56 must be separated from the ingot 76 when the slicing operation at each work station is completed. To achieve this, the weight 88 suspended from the free end 90 of the balance arm 80 comprises a plurality of small metal spheres or bearings such as lead shot held in a funnel 92 by a gate 94 pivotably attached to a collar 95 secured to the funnel 92. To operate the gate 94, a trigger arm 93 is pivotably attached to the collar 95 diagonally opposite to the gate 94. The arm 93 includes a projection which extends sufficiently below the mouth of the funnel 92 to support the gate 94 and extends outward from its point of attachment to make contact with a stop or bracket 96 positioned on the frame 10 in the vertical path of movement of the arm 93. Thus as the blades 56 slice through the ingot 76 the arm 68 rotates clockwise the balance arm 80 rotates downward or counterclockwise resulting in the arm 93 striking the stop 96.

Thereafter further downward movement of the funnel 92 causes the arm 93 to rotate counterclockwise until the gate 94 is freed from in contact with the projection and it rotates clockwise. This opens the mouth of the funnel 92 and the weights gradually empty into a container 98 positioned below the mouth of the funnel 92. As this occurs the weight on the balance arm is gradually reduced since all of the shot cannot pass through the mouth of the funnel at one time. Thus, when the composite weight of the ingot 76, holding fixture 74, and platform 68 exceeds that of the balance arm 80 and remaining weights in the funnel 92, the support arm 68 will rotate counterclockwise to remove the ingot 76 from in contact with the blades 56.

In addition, a microswitch 100 is mounted as a portion of or adjacent to the stop 96 so that it is actuated by the gate 94. Thus, if a microswitch was similarly mounted at each work station, a conventional electrical circuit could be provided which would disable the electric motor 16 when the last cutting operation was completed. Such a circuit could typically include four normally closed microswitches, each of which is positioned at each work station as discussed above. By connecting these switches in parallel with one side of the source of electric power for the electric motor 16 when the last of the switches is actuated the source of electric power will be interrupted and the motor 16 disabled.

For simultaneous reciprocation of the cutting assemblies 12 the single electric motor 16 is mounted to the frame 10 intermediate the four work stations which, for efficient utilization of the motor 16, are positioned two on either side of the motor (as viewed in FIG. 1) in a symmetrical rectangular arrangement so that two can be operated from each of two drive shafts. A first drive shaft 102 is coupled to the output shaft of the motor by a conventional pulley and belt arrangement 103 and has mounted to it a driver gear 104 which is in engagement with a driven gear 106 mounted to a second drive shaft 108. The electric motor 16 is typically a conventional variable speed motor and includes, to vary the frequencies of reciprocation of the cutting assemblies 12, a variable speed control 110 mounted to the top of the frame 10 at a position for easy operation by an operator. Also mounted to the frame 10 adjacent to the motor 16 is an electric power control switch 112 for actuation of the electric motor and an abrasive system control switch 113 both shown as conventional push button switches.

Referring to FIG. 3, to translate the rotational motion of the drive shafts to a linear motion for reciprocation of the cutting assemblies 12, a crank assembly 114 is keyed to the end of each of the drive shafts 102, 108, shown in FIG. 1. The crank assembly 114 includes crank 116 having an elongated aperture 118 and a plurality of grooves 120 positioned transversely of the crank along a portion of the periphery of the aperture. A crank pin 122 having a threaded end extends through the aperture 118 and through a sleeve 124 into threaded engagement with a threaded nut 126 having the shape of a knurled knob. The sleeve 124 is inserted into a conventional bearing assembly 128 which forms part of the connecting rod assembly 36 and has a projection 130 of sufficient dimension to be inserted into one of the grooves 120 in the crank 116. Since the connecting rod assembly 36 is attached at one end to the attachment flange 38 of the sled member 28 and at the other end to the crank assembly 114, any rotational motion of the shaft is translated into linear reciprocal motion of the sled. To control the amplitude of reciprocation of the sled, the coupling of the connecting rod assembly 36 to the crank 116 is changed by retracting the projection 130 from one of the grooves 120 and positioning it in another. This either shortens or lengthens the crank arm of the crank assembly 114 and correspondingly the length of travel of the sled 28.

Since the inertia of each of the cutting assemblies 12 is large, because of the weight of the sled 28 and blade frame 40, to stabilize the device against possible movement, the cranks 116 are attached in a dynamically balanced relationship to the drive shafts. This arrangement is schematically illustrated in FIG. 4. Here each of the cranks 116 is shown to be producing movement in the cutting assembly 12 coupled to it opposite in direction from the movement of the cutting assembly driven by the other crank attached to the same drive shaft. In addition, each crank is keyed to a drive shaft to project out from the shaft in an opposite direction or at a position rotated 180° of arc from the other crank keyed to the same shaft. While each crank is displaced 180° of arc from the other crank, on the same shaft, it is so arranged that it is displaced only 90° of arc from the adjacent crank keyed to the other drive shaft.

The supply of the abrasive material to the cutting blades such as, for instance, in the form of a solution of silicon carbide and petroleum may be effected in any suitable manner as will suggest itself to those skilled in the art. In the presently preferred embodiment, as shown in FIG. 2, this supply includes a reservoir 144, an electric pump 146, tubing connecting the reservoir through a shutoff valve 148 to a nozzle or jet 150 positioned over the reciprocating path of the blade package at each work station and a drawer 152 and drip tray 154 emptying into the reservoir 144 by a return path. The nozzles 150 are shaped to supply, across the width of the blade assembly 44, a continuous fan of abrasive material.

It has been found that the cutting efficiency of the blades and abrasive may be increased by inclining the cutting edge of the blades relative to their plane of reciprocation. While this may be achieved in many ways it is accomplished in the presently preferred embodiment by the extending of an elevating screw 132 that is threaded through in a bore in one end of the blade frame 40 into engagement with a recess 134 in the sled 28 shown best in FIG. 2. If the elevating screw 132 is rotated sufficiently to increase its length adjacent to the sled it causes one end of the blade frame 40 to be elevated in respect to the sled 28. The elevation of one end of a carrier member has been shown at 136 in FIG. 1.

One method of securing an ingot 76 to the support platform 68 is shown in FIG. 5. Here, the ingot is bonded by a bonding agent such as an epoxy to the holder 174 typically of a ceramic material which is secured to a metal plate 140 attached to the platform 68 by a conventional fastening means such as a plurality of bolts (not shown). Also shown in FIG. 5 is an alternative method of providing an automatic shutoff or disabling feature for the device. Here is shown a portion of an insulated conductor 142 bonded beneath the ingot 76. By bonding a conductor in such a manner at each work station and connecting the four conductors in parallel to a standard relay circuit coupled to the source of electric power for the electric motor and abrasive supply system, when the last of the conductors 142 has its insulation pierced by the blades as they complete the slicing of the last ingot grounding the conductor, the power to the electric motor and the abrasive supply system is interrupted resulting in a disabling of the device.

While but one embodiment of this invention has been herein illustrated, it will be appreciated by those skilled in the art that variations in the disclosed arrangement, both as to its details and as to the organization of such details may be made without departing from the spirit and scope hereof. Accordingly, it is intended that the foregoing disclosure and the showings made in the drawings shall be considered only as illustrative of the principles of this invention and not construed in a limiting sense.

We claim as our invention:

1. A device for cutting into slices a crystal body comprising:
   a cutting assembly including at least two relatively thin metal ribbon blades adapted to provide a pair of parallel cutting edges spaced by a distance proportional to the thickness of the slices to be cut from said body;
   a work piece holding assembly for positioning said body in engagement with the edge of said blades, said holding assembly including a force biasing means to bias said body into engagement with said blades under a resilient pressure and retracting means responsive to the position of said body to separate one of said bodies from said blades when it has been sliced;
   a drive means coupled to said cutting assembly for reciprocating said assembly;
   abrasive supply means to apply an abrasive to said blades; and
   a disabling means responsive to actuation of said retracting means and coacting with said work piece holding assembly to deactivate said drive means when said body has been sliced.

2. A device for cutting into slices a plurality of crystal bodies comprising:
   a plurality of reciprocable cutting assemblies each including at least two relatively thin metal ribbon blades adapted to provide a pair of parallel cutting edges spaced by a distance proportional to the thickness of the slices to be cut from said body;
   a plurality of work piece holding assemblies for positioning said bodies in engagement with the cutting edge of said blades, said holding assemblies each including a force biasing means to bias one of said bodies into engagement with said blades under a resilient pressure and a retracting means responsive to the position of said body to separate one of said bodies from said blades when it has been sliced;
   a drive means coupled to said cutting assemblies to reciprocate each of said assemblies;
   abrasive feed means to apply a liquid abrasive stream to said blades; and
   a disabling means responsive to actuation of said retracting means and coacting with each of said work piece holding assemblies to deactivate said drive means when the last of said bodies has been sliced.

3. A device for simultaneously cutting into slices a plurality of semiconductor crystal bodies comprising:
   a plurality of reciprocable cutting assemblies each including at least two relatively thin metal ribbon blades adapted to provide a pair of parallel cutting edges spaced by a distance proportional to the thickness of the slices to be cut from said body;
   a plurality of work piece holding assemblies for positioning said bodies in engagement with the edge of said blades, said holding assemblies each including a force biasing means to bias one of said bodies into engagement with said blades under a resilient pressure and retracting means to separate one of said bodies from said blades when it has been sliced;
   a single drive means coupled to said cutting assemblies to simultaneously reciprocate each of said assemblies;
   abrasive feed means to continuously apply a liquid abrasive to said blades; and
   a disabling means coacting with each of said work piece holding assemblies to deactivate said drive means and abrasive feed means when the last of said bodies has been sliced.

4. A device for simultaneously cutting into slices a plurality of semiconductor crystal bodies comprising:
   a plurality of reciprocable cutting assemblies each including a blade assembly having at least two relatively thin metal ribbon blades adapted to provide a pair of parallel cutting edges spaced by a distance proportional to the thickness of the slices to be cut from said body;
   a plurality of body holding assemblies for positioning said bodies in engagement with the edge of said blades, said holding assemblies each including a force biasing means to bias one of said bodies into engagement with said blades under a slight resilient pressure and a retracting means to separate one of said bodies from said blades when it has been sliced;
   a single drive means coupled to said cutting assemblies to simultaneously reciprocate each of said cutting assemblies in a dynamically balanced relationship;
   abrasive feed means to continuously apply a liquid abrasive to said blades; and
   a disabling means coacting with each of said work piece holding assemblies to deactivate said drive means and abrasive feed means when the last of said bodies has been sliced.

5. A device for simultaneously cutting into slices a plurality of semiconductor crystal bodies comprising:
   a plurality of reciprocable cutting assemblies each including at least two relatively thin metal ribbon blades adapted to provide a pair of parallel cutting edges spaced by a distance proportional to the thickness of the slices to be cut from said body;
   a plurality of work piece holding assemblies for positioning said bodies in engagement with the cutting edge of said blades, said holding assemblies each including a support arm adapted to be pivoted about a first end and having one of said bodies mounted to a second end and a retracting means to separate one of said bodies from said blades when it has been sliced;
   a single drive means coupled to said cutting assemblies to simultaneously reciprocate each of said assemblies;
   abrasive feed means to continuously apply a liquid abrasive stream to said blades; and
   a disabling means coacting with each of said work piece holding assemblies to deactivate said drive means and abrasive feed means when the last of said bodies has been sliced.

6. A device for simultaneously cutting into slices a plurality of semiconductor crystal bodies comprising:
   a plurality of reciprocable cutting assemblies each including a blade assembly having at least two relatively thin metal ribbon blades adapted to provide a pair of parallel cutting edges spaced by a distance proportional to the thickness of the slices to be cut from said body;
   a plurality of work piece holding assemblies for positioning said bodies in engagement with the cutting edge of said blades, said holding assemblies each including a support arm adapted to be pivoted about a first end and having one of said bodies mounted to a second end and a changeable weight means coupled to said arm at said first end for rotating one of said bodies into engagement with said blades under a resilient pressure, said weight means being adapted to be automatically reduced in magnitude when one of said bodies has been sliced to disengage it from the cutting edge of said blades;
   a single drive means coupled to said cutting assemblies to simultaneously reciprocate each of said cutting assemblies in a dynamically balanced relationship;
   abrasive feed means to continuously apply a liquid abrasive stream to said blades; and
   a disabling means coacting with each of said work piece holding assemblies to deactivate said drive means and abrasive feed means when the last of said bodies has been sliced.

7. A device for simultaneously cutting into slices a plurality of semiconductor crystal bodies comprising:
   a purality of reciprocable cutting assemblies each including a sled member, a carrier member retained within said sled member, and a blade assembly having at least two relatively thin metal ribbon blades adapted to provide a pair of parallel cutting edges spaced by a distance proportional to the thickness of the slice to be cut from said body, said blade assembly being removably positioned in said carrier member whereby the direction of reciprocation of said carrier member is paralel with the cutting edge of said blades;

a plurality of work piece holding assemblies for positioning said bodies in engagement with the edge of said blades, said holding assemblies each including a force biasing means to bias one of said bodies into engagement with said blades under a resilient pressure and a retracting means to separate one of said bodies from said blades when it has been sliced;

a single drive means coupled to said cutting assemblies to simultaneously reciprocate each of said cutting assemblies in a dynamically balanced relationship;

abrasive feed means to continuously apply a liquid abrasive to said blades; and a disabling means coacting with each of said work piece holding assemblies to deactivate said drive means and abrasive feed means when the last of said bodies has been sliced.

8. A device for simultaneousy cutting into slices a plurality of semiconductor crystal bodies comprising:

a plurality of reciprocable cutting assemblies each including a sled member, a carrier member retained within said sled member, and a blade assembly having at least two relatively thin metal ribbon blades adapted to provide a pair of parallel cutting edges spaced by a distance proportional to the thickness of the slice to be cut from said body, said blade assembly being removably positioned in said carrier member whereby the direction of reciprocation of said carrier member is parallel with the cutting edge of said blades;

a plurality of work piece holding assemblies for positioning said bodies in engagement with the cutting edge with said blades, said holding assemblies each including a support arm adapted to be pivoted about a first end and having one of said bodies mounted to a second end and a changeable weight means coupled to said platform at said first end for rotating one of said bodies into engagement with said blades under a resilient pressure, said weight means being adapted to be automatically reduced in magnitude when said body has been sliced to rotate said body from engagement with said blades;

a single drive means coupled to said cutting assemblies to simultaneously reciprocate each of said cutting assemblies in a dynamically balanced relationship;

abrasive feed means to continuously apply a liquid abrasive stream to said blades; and a disabling means coacting with each of said work piece holding assemblies to deactivate said drive means and abrasive feed means when the last of said bodies has been sliced.

9. A device for simultaneously cutting into slices a plurality of semiconductor crystal bodies comprising:

a plurality of cutting assemblies each adapted to be linearly oscillated and including a sled member, a carrier blade frame retained within said sled member, and a blade assembly having at least two relatively thin metal ribbon blades adapted to provide a pair of parallel cutting edges spaced by a distance proportional to the thickness of the slice to be cut from said body, said blade assembly being pivotably mounted in said blade frame member to provide that the direction of reciprocation of said carrier member be at a slight angle with the cutting edge of said blades;

a plurality of work piece holding assemblies for positioning said bodies in engagement with the edge of said blades, said holding assemblies each including a force biasing means to bias one of said bodies into engagement with said blades under a resilient pressure and a retracting means to separate said bodies from said blades when said bodies have been sliced;

a single drive means coupled to said cutting assemblies to simultaneously reciprocate each of said cutting assemblies in a dynamically balanced relationship;

abrasive feed means to continuously apply a liquid abrasive stream to said blades; and a disabling means coacting with each of said work piece holding assemblies to deactivate said drive means and abrasive feed means when the last of said bodies has been sliced.

10. A device for simultaneously cutting into slices a plurality of semiconductor crystal bodies comprising:

a plurality of cutting assemblies each adapted to be linearly oscillated and including a sled member, a blade frame retained within said sled member, and a blade assembly having at least two relatively thin metal ribbon blades adapted to provide a pair of parallel cutting edges spaced by a distance proportional to the thickness of the slice to be cut from said body, said blade assembly being pivotally mounted in said blade frame to provide that the direction of reciprocation of said carrier member be at a slight angle with the cutting edge of said blades;

a plurality of work piece holding assemblies for positioning said bodies in engagement with the cutting edge of said blades, said holding assemblies each including a support arm adapted to be pivoted about a first end and having one of said bodies mounted to a second end and a changeable weight means coupled to said platform at said first end for rotating said body into engagement with said blades under a resilient pressure, said weight means being adapted to be automatically reduced in magnitude when said body has been sliced to disengage said body from the cutting edge of said blades;

a single drive means coupled to said cutting assemblies to simultaneously reciprocate each of said assemblies in a dynamically balanced relationship;

abrasive feed means to continuously apply a stream of liquid abrasive to said blades; and a disabling means coacting with each of said work piece holding assemblies to deactivate said drive means and abrasive feed means when the last of said bodies has been sliced.

11. A device for simultaneously cutting into slices a plurality of semiconductor crystal bodies comprising:

a frame member;

a plurality of sled members each positioned in said frame member for independent reciprocation thereon;

a carrier member retained in each of said sled members for movement therewith;

at least two relatively thin metal ribbon blades adapted to provide a pair of parallel cutting edges spaced by a distance proportional to the thickness of the slice to be cut from said body, said blades being mounted in said carrier member;

a plurality of supporting means each adapted to support one of said crystal bodies, said supporting means being arranged relative to said sled members for edgewise engagement of said blades with said bodies under resilient pressure;

a retracting means coupled to each of said supporting means to separate each of said bodies from engagement with said blades when said bodies have been sliced;

a source of electrical power;

an electric motor electrically coupled to said source of electrical power and mechanically coupled to said sled members to simultaneously reciprocate each of said sled members in a dynamically balanced relationship;

abrasive feed means connected to said source of electrical power to continuously apply a stream of liquid abrasive to said blades; and a disabling circuit coupled to said motor and abrasive feed means and coacting with each of said bodies to deactivate said motor and abrasive feed means when the last of said bodies has been sliced.

12. A device for simultaneously cutting into slices a plurality of semiconductor crystal bodies comprising:

a frame member;

a plurality of sled members each positioned in said frame member for independent reciprocation thereon;

a carrier member retained in each of said sled members for movement therewith;

a blade assembly having at least two relatively thin metal ribbon blades adapted to provide a pair of parallel cutting edges spaced by a distance proportional to the thickness of the slice to be cut from one of said bodies, said blades being mounted in said carrier member;

a plurality of supporting means each adapted to support one of said crystal bodies, said supporting means being arranged relative to said sled members for edgewise engagement of said blades with said bodies under resilient pressure;

a retracting means coupled to each of said supporting means to separate said blades and bodies when said bodies have been sliced;

a source of electrical power;

an electric motor electrically coupled to said source of electrical power and mechanically coupled to said sled members to simultaneously reciprocate each of said sled members in a dynamically balanced relationship;

abrasive feed means connected to said source of electrical power including a pump and reservoir to continuously apply a liquid abrasive to said blades; and a disabling circuit including a plurality of normally closed electrical switches connected in parallel to said motor and abrasive feed means and to said source of electrical power each being located in juxtaposition to one of said retracting means for actuation thereby to disable said motor and abrasive feed means when the last of said bodies has been sliced.

13. A device for simultaneously cutting into slices a plurality of semiconductor crystal bodies comprising:

a frame member;

a plurality of sled members each positioned on said frame member for independent reciprocation thereon;

a carrier member retained in each of said sled members for movement therewith;

a blade assembly having at least two relatively thin metal ribbon blades adapted to provide a pair of parallel cutting edges spaced by a distance proportional to the thickness of the slice to be cut from one of said bodies, said blades being mounted in said carrier member;

a plurality of supporting platforms each adapted to be pivoted about a first end and having a body mounted to a second end and a changeable weight means coupled to said platform at said first end for positioning said body relative to said sled members for edgewise engagement of said blades therewith under resilient pressure;

a retracting means included in said changeable weight means for separating said blades and bodies when each of said bodies has been sliced;

a source of electrical power;

an electric motor electrically coupled to said source of electrical power and mechanically coupled to said sled members to simultaneously reciprocate each of said sled members in a dynamically balanced relationship;

abrasive feed means connected to said source of electrical power including a pump and reservoir to continuously apply a liquid abrasive to said blades; and a disabling circuit coupled to said motor and said abrasive feed means and to said source of electrical power, said circuit including a plurality of normally closed electrical switches each of which is located in juxtaposition to one of said retracting means for actuation thereby, said switches being electrically connected in parallel between said source of electrical power and said motor and abrasive feed means whereby when the last of said switches is actuated the electrical path between said source of power and said motor and abrasive feed means will be interrupted.

14. A device for simultaneously cutting into slices a plurality of semiconductor crystal bodies comprising:

a frame member;

a plurality of sled members each positioned on said frame member for independent reciprocation thereon;

a carrier member retained in each of said sled members for movement therewith;

a blade assembly having at least two relatively thin metal ribbon blades adapted to provide a pair of parallel cutting edges spaced by a distance equal to the thickness of the slice to be cut from one of said bodies, said blades being mounted in said carrier member;

a plurality of supporting platforms each adapted to be pivoted about a first end and having a body mounted to a second end and a changeable weight means to said platform at said first end for positioning said body relative to said sled members for edgewise engagement of said blades therewith under resilient pressure;

a retracting means included in said changeable weight means for separating said blades and bodies when each of said bodies has been sliced;

a source of electrical power;

an electrical motor electrically coupled to said source of electrical power and mechanically coupled to said sled members to simultaneously reciprocate each of said sled members in a dynamically balanced relationship;

abrasive feed means having connected to said source of electrical power including a pump and reservoir to continuously apply a liquid abrasive to said blades; and a disabling circuit coupled to said motor and abrasive feed means, said circuit including a plurality of parallel connected insulation covered electrical conductors each of which is coupled to said source of electrical power and to said motor and abrasive feed means and includes a portion mounted adjacent to one of said bodies whereby the blades slicing through said bodies will sever the insulation of said conductors and will disable said motor and abrasive feed means when the last of said conductor portions is severed.

References Cited by the Examiner
UNITED STATES PATENTS

| | | | |
|---|---|---|---|
| 1,745,873 | 2/1930 | Stoltz | 83—364 |
| 2,803,239 | 8/1957 | D'Avancourt | 125—21 |
| 3,032,026 | 5/1962 | Raabe | 125—21 |
| 3,054,314 | 9/1962 | Anderson | 83—68 |

HAROLD D. WHITEHEAD, *Primary Examiner.*